United States Patent
Sorokin

(10) Patent No.: US 9,428,699 B2
(45) Date of Patent: Aug. 30, 2016

(54) PROCESS FOR THE TREATMENT OF CRUDE OIL AND PETROLEUM PRODUCTS

(76) Inventor: Sergey Sorokin, Moscow (RU)

(*) Notice: Subject to any disclaimer, the term of this patent is extended or adjusted under 35 U.S.C. 154(b) by 733 days.

(21) Appl. No.: 13/519,520

(22) PCT Filed: Jan. 14, 2011

(86) PCT No.: PCT/IB2011/050165
§ 371 (c)(1),
(2), (4) Date: Jun. 27, 2012

(87) PCT Pub. No.: WO2011/086522
PCT Pub. Date: Jul. 21, 2011

(65) Prior Publication Data
US 2012/0305383 A1   Dec. 6, 2012

(51) Int. Cl.
*C10G 32/02* (2006.01)
*C10G 33/02* (2006.01)

(52) U.S. Cl.
CPC .............. *C10G 32/02* (2013.01); *C10G 33/02* (2013.01); *C10G 2300/1033* (2013.01)

(58) Field of Classification Search
CPC ................................ C10G 32/00; C10G 32/02
See application file for complete search history.

(56) References Cited

U.S. PATENT DOCUMENTS

| | | | |
|---|---|---|---|
| 3,616,375 A | 10/1971 | Inoue | |
| 4,804,918 A | 2/1989 | Vail, III | |
| 5,824,203 A | 10/1998 | Remo | |
| 2003/0051989 A1 | 3/2003 | Austin | |
| 2006/0180500 A1* | 8/2006 | Gunnerman | 208/15 |
| 2007/0272618 A1 | 11/2007 | Gou | |
| 2008/0143330 A1 | 6/2008 | Mario | |
| 2008/0156701 A1 | 7/2008 | Shlyachtin | |

FOREIGN PATENT DOCUMENTS

| | | |
|---|---|---|
| EP | 06667386 A1 | 8/1995 |
| EP | 1233049 A1 | 8/2002 |
| EP | 1260266 A1 | 11/2002 |
| EP | 1970109 A1 | 9/2008 |
| RU | 2149886 C1 | 5/2000 |
| RU | 2215775 C1 | 10/2003 |
| RU | 2215775 C1 | 11/2003 |

OTHER PUBLICATIONS

Gunal, Gizem and M.R. Islam, "Alteration of asphaltic crude rheology with electromagnetic and ultrasonic irradiation", Journal of Petroleum Science and Engineering, 26( May 2000), pp. 263-272.*
WIPO International Search Report (PCT/IB2011/050165).

* cited by examiner

*Primary Examiner* — Renee E Robinson
(74) *Attorney, Agent, or Firm* — Mark Terry

(57) ABSTRACT

There is provided a process, and a device, for the treatment of crude oil, component(s) of crude, or mixtures thereof, to convert components of said hydrocarbon liquid to products having boiling points that are lower than the boiling points of said components prior to treatment. The process comprises subjecting crude to be treated to ultrasound vibrations and to an electromagnetic field emitted by a an electromagnetic field generator; wherein the electromagnetic field emitted by said electromagnetic field generator comprises a component of electromagnetic field modulated by an electromagnetic field emitted from the crude to be treated on the exposure thereof to ultrasound vibrations.

10 Claims, 1 Drawing Sheet

PROCESS FOR THE TREATMENT OF CRUDE OIL AND PETROLEUM PRODUCTS

This patent application claims priority to international patent application number PCT/IB2011/050165, filed Jan. 14, 2011, and entitled "Process for the Treatment of Crude Oil and Petroleum Products," which claims priority to U.S. provisional patent application No. 61/295,225, filed Jan. 15, 2010, and entitled "Process for the Treatment of Crude Oil and Petroleum Products." International patent application number PCT/IB2011/050165 and U.S. provisional patent application No. 61/295,225 are hereby incorporated by reference in their entirety.

The present invention relates to the field of industrial processing of hydrocarbon liquids, in particular crude oil and petroleum products. More particularly, the present invention is concerned with a method and a device for the processing of crude oil, components of crude, or mixtures thereof to increase the light hydrocarbon content thereof.

Crude oil is qualified according to a number of different grades, of which the economic value depends largely on the quantative proportion of the more useful lower boiling point fractions (such as e.g. propane, butane, gasoline, naphtha, kerosene, etc.) compared to that of high boiling point fractions (e.g. heavy oil, fuel oil, rectification residues etc.). The utility of crude oil, particularly heavy crude oil grades, may be increased by remove sulphur in its various forms, and/or to increase quantitatively the proportion of species of lower boiling points and lower molecular weight. Similarly the utility of crude may be expanded by converting components of petroleum residuum (or rectification residues), which are the heavy fractions remaining after the most readily accessible components (lower boiling point fractions) of crude are extracted by distillation, into lighter, i.e. lower boiling point, components. In the literature there have been described a number of methods for converting a proportion of the higher boiling components of crude oil (e.g. heavy oil, fuel oil, etc. components), or of petroleum residues, to lower boiling components (e.g. propane, butane, gasoline, naphtha, kerosene, etc. components), based on the excitation of the crude oil, or petroleum residues, by subjecting to mechanical vibrations or electromagnetic fields.

The patent RU2149886 describes a method of excitation of crude oil, and other liquids containing bonded hydrogen, by means of the effect of vibrations on the liquid, aimed at destructive transformation of its chemical bonds at the molecular level. RU2149886 uses as the source of mechanical vibration, a solenoid of 0.1-150 KW and frequency of $1$-$10^6$ Hz.

Also may be mentioned, EP06667386 which describes a process for cracking crude oil and petroleum products which involves subjecting raw material crude oil/petroleum products to ultrasound treatment, using as a source of the ultrasound a rotary-type hydrodynamic acoustic emitter. The intensity of the ultrasound used is described as 1-10 $MW/m^2$, and the process is carried out under a static pressure of between 0.2 to 5 MPa. According to EP06667386 the process described therein, using ultrasound of intensity 1 $MW/m^2$ or greater, produces cavitation bubbles in the hydrocarbon liquid, whereby collapse of the cavitation bubbles (during the compression half-cycle) releases an amount of energy exceeding the atomic bond energy of the molecule, leading to cleavage of bonds of the molecule.

The method of pre-treatment of liquids according to EP0667386 comprises the consecutive supply of liquid into the cavities of several blade-type rotor wheels, discharge of the liquid from the cavity of each rotor wheel into the cavity of a stator through outlet openings of the rotor wheels and straight-through openings of the stator. The flows of liquid running out from the outlet openings of the rotor wheels undergo sharp periodical interruptions, which induce the mechanical vibrations of acoustic frequency in the liquid. According to EP0667386 a device for fractionation of hydrocarbon liquids is coupled with the device for the above-described pre-treatment of the liquids, and comprises a separation chamber conjugated with the last wheel for separation of the treated liquid into liquid and vapour phases, and a chamber for condensing the vapour phase, communicating with the separation chamber.

Methods of excitation of hydrocarbon-containing liquids, such as crude oil, by means of acoustic vibrations have been widely investigated in the state of the art. In general, these methods comprise the transfer of vibrational energy to a liquid by means of a source of mechanical vibrations interacting with the liquid. The source of the mechanical vibrations may be provided by mechanical, electro-mechanical, magnetostrictive, piezoelectric, hydrodynamic, or other type of acoustic vibration source.

In EP1260266 there is described a process and device for the resonant excitation of hydrocarbon liquids in which a rotary hydrodynamic source of mechanical oscillations is used to provide resonant excitation of the liquid. According to EP1260266 the resonant excitation of the liquid is affected abiding by the relationship:

$$nR=1.16141\ F,$$

wherein, n [1/s]=rotation frequency of the rotary wheel, R[m]=the radius of the peripheral surface of the rotary wheel, n=the rotation frequency of the rotary wheel and, the resonant excitation of the liquid is executed on one of the basic frequencies obeying the common relationship:

$$F=F_1 N^{-1/2}$$

where, N=the selected integer and N≥1, and $F_1$=63.992420 [kHz] (the basic oscillation frequency at N=1).

The method of EP1260266 is reported to provide resonant excitation of the hydrocarbon liquids, causing the destructive transformation of the chemical bonds of the hydrocarbon liquid at the molecular level, and results in an increase in the yield of light hydrocarbon fractions upon subsequent fractionation.

The use of electromagnetic vibration generated by electronic or electromechanical devices for the excitation of hydrocarbon-containing liquids, such as crude oil, has also been investigated. For instance, EP1233049 describes a method for the qualitative upgrade of crude oil, to increase the content of lower boiling fractions, in which crude oil is subjected to electromagnetic waves of multiple frequencies, covering one or more wide frequency ranges, within the electromagnetic spectrum from 1 Hz to 300 GHz. The electromagnetic waves are produced by an electronic or electromagnetic source with the emission of the electromagnetic waves being pulsatory and/or temporarily interruptible. In the process of EP1233049, an emitting antenna, of an electronic or electromagnetic device generating electromagnetic waves, placed inside a storage tank containing crude oil emits electromagnetic waves of multiple frequencies into the space occupied by the volume of crude oil in the tank.

US 2008/0156701 describes a method for the treatment of hydrocarbon liquids, to increase the output of light hydrocarbons, wherein the hydrocarbon liquid is subjected to primary and principal applications of electromagnetic oscillations. The primary application of electromagnetic oscillations is carried out at a stage preceding supply of the hydrocarbon material to thermal cracking, and the principle application of electromagnetic oscillations is carried out in the rectifying column. According to US 2008/0156701 the principal excitation of the hydrocarbon raw material is affected at one of the basic frequencies according to the relation:

$$F=(153511+562.311\times T)\times 10^8, Hz,$$

wherein T is the temperature (C.°); 562.311 is the universal constant characterising the range of frequency variation of an atom of hydrogen of the electron shell, with the temperature varied by one degree (Hz/degree); and 153511 is an operator obtained by multiplication of the universal constant by 273 degrees (Hz).

According to US 2008/0156701 primary application of electromagnetic excitation may be made both in the pipeline supplying hydrocarbon liquid to thermal cracking, and in the operating container(s) used for storage and/or supply of hydrocarbon liquid to thermal cracking, and the primary excitation source is provided by an electromagnetic oscillator, for example by a circular magnetostrictive transducer, or other electromagnetic radiator, operating at a fixed predetermined frequency. The rectifying column is designed so as to provide for resonant excitation, and serves as the principal exciter of the hydrocarbon material.

In RU2215775 there is described a method for processing heavy oil residues (e.g. mazot, scavenge motor or lubricating oils, oil slimes) which involves a pre-treatment of the oil residue feedstock by application of oscillatory excitation over a wide range of frequencies, from acoustic to light frequencies, prior to thermal cracking. A generator and radiator of acoustic vibrations and a separate generator of electromagnetic waves, connected to an emitter aerial located inside the pre-treatment container, are used to provide acoustic and electromagnetic frequency oscillations. As the generator of acoustic vibrations is described a centrifugal pump, mounted at the inlet of the pre-treatment container, with the radiator of acoustic vibrations being provided by a pipeline supplying feedstock to the pre-treatment container. The process of RU2215775, using high intensity electromagnetic fields, causes the destructive transformation of the chemical bonds of the high molecular weight hydrocarbon molecules at the molecular level, i.e. leads to cracking of high molecular weight hydrocarbon molecules. After pre-treatment the heavy oil residue is subjected to thermal cracking in a thermal cracking apparatus connected to the outlet of the pre-treatment container, comprising a cracking reservoir connected to a reflux-distiller and accumulating containers.

Such methods and installations for treatment of hydrocarbon-containing liquids, such as crude oil or petroleum residuum, by use of mechanical or electromagnetic vibration sources, make it possible to increase the proportional output of the more-valuable lighter hydrocarbon fractions. However, in practice the potential of such technology remains unrealised to its full extent. Among the reasons are insufficient efficiency of the known devices.

Treatment processes using high intensity ultrasound to produce cavitation have the drawback of destroying high molecular structure in crude oil. Further in such processes there is risk of damage to elements of equipment in the zone where cavitation occurs due to the action of the high intensity ultrasound vibrations.

To date no such process for the treatment of hydrocarbon liquids to increase yield of the more-valuable light hydrocarbons has been successfully implemented on industrial commercial scale.

There remains a need for alternative, and improved, processes and device for the treatment of crude oil, and petroleum residuum, to increase yield of the more-valuable light hydrocarbons.

An aim of the present invention is to overcome some or all of the disadvantages of the above-described known methods for the treatment of crude oil.

An object of the invention is to provide a process and device for the treatment of crude oil, components of crude, or mixtures thereof, to increase the proportion of lower viscosity, light hydrocarbons, which is energy efficient.

There is now provided a process for the treatment of crude oil and/or components of crude comprising subjecting the crude to ultrasound and to a resonating electro-magnetic field of high frequency. There is also provided a device for carrying out the method.

Objects of the invention are achieved by a method for treating a crude oil and/or components of crude.

There is now provided a process for the treatment of crude oil, component(s) of crude, or mixtures thereof, comprising subjecting crude to be treated to ultrasound vibrations and to an electromagnetic field emitted by a an electromagnetic field generator; wherein the electromagnetic field emitted by said electromagnetic field generator comprises a component of electromagnetic field modulated by an electromagnetic field emitted from the crude to be treated on the exposure thereof to ultrasound vibrations.

According to an embodiment of the invention the electromagnetic field emitted by the electromagnetic field generator comprises a component of electromagnetic field generated by an external electronic or electromechanical source.

According to an embodiment of the invention the electromagnetic field generator emits electromagnetic field at one or more frequencies producing resonant excitation of the crude to be treated.

According to an embodiment of the invention the external electronic or electromechanical source of electromagnetic field comprises a high frequency current generator.

According to an embodiment there is provided a process comprising subjecting a flow of crude to be treated to ultrasound vibrations emitted by a source of ultrasound; detecting an electromagnetic field emitted by said crude on treatment with ultrasound and converting said detected electromagnetic field into an electric current signal; generating a high frequency electrical current signal using a current generator; combining said current signal produced by conversion of the detected electromagnetic field emitted by the crude on treatment with ultrasound with a said current signal generated by the current generator; transforming the combined current signal into an electromagnetic field; and subjecting the flow of crude to be treated to the thus produced electromagnetic field.

Optionally, at least a portion of the flow of crude treated with ultrasound vibrations and electromagnetic field may be subjected to one or more additional cycles of the treatment with ultrasound vibrations and electromagnetic field.

Optionally, at least a portion of the crude oil, component(s) of crude, or mixture thereof, after treatment with the ultrasound vibrations and resonating high frequency electromagnetic field may be added to a volume of untreated crude oil, component(s) of crude, or mixture thereof.

According to an embodiment there is now provided a device for the treatment of crude oil, component(s) of crude, or mixture thereof, comprising an ultrasound generator, an electromagnetic field generator, and one or more electromagnetic field sensor(s); wherein said electromagnetic field generator is configured to emit an electromagnetic field having a component of electromagnetic field modulated by an electromagnetic field detected by the electromagnetic field sensor(s).

The method and device of the invention may advantageously be applied to any crude oil, component(s) of crude oil, or mixture thereof.

The term "crude oil" includes crude oil of any grade. The term "component of crude oil" includes intermediate and final products of crude processing, including any fractions of crude. The term "fractions of crude" takes its normal meaning in the art and covers the most useful petroleum product fractions, such as liquid petroleum gas, gasoline, naphtha, kerosene, diesel, as well as the heavy fractions and residuum, such as heavy fuel oil, petroleum residue, lubricating oils.

The term "light hydrocarbons" takes its normal meaning in the art, and refers particularly to those hydrocarbon petroleum products having a boiling point of less than or equal to 360° C. Examples of light hydrocarbons include, for instance, propane, butane, naphtha, gasoline, kerosene and diesel petroleum product fractions. The term "heavy hydrocarbons" takes its normal meaning in the art, and refers particularly to those hydrocarbon petroleum products having a boiling point of higher than 360° C. Examples of heavy hydrocarbons include, for instance, heavy oil, fuel oil, petroleum residue, petroleum tar, asphalt, bitumen.

Examples of hydrocarbon liquids that may advantageously be treated by the method, and the device, of the present invention include crude oil, components of crude oil such as heavy oil, fuel oil, lubricating oil, and petroleum residuum, or mixtures thereof with petroleum product fractions. Crude oil, in particular heavy grades of crude oil; petroleum residuum; and components of crude, or mixtures of components of crude, containing heavy hydrocarbons e.g. with boiling point of 360° C. or more; may be mentioned in particular. Also, mixtures thereof with petroleum products such as gasoline, naphta, etc.

In one embodiment of the invention the hydrocarbon liquid is crude oil. In one embodiment of the invention the hydrocarbon liquid is petroleum residuum. In another embodiment of the invention the hydrocarbon liquid is a mixture of petroleum residuum and one or more petroleum products, such as naphtha gasoline.

Advantageously, the process and the device according to the invention make it possible to increase the proportion of light hydrocarbons, particularly hydrocarbons having a boiling point in the range of 30° C. to 360° C., in the treated crude oil product.

Advantageously embodiments of the process, and device, of the invention make it possible to increase the yield of light and medium hydrocarbon fractions, e.g. diesel fraction, from heavy crude or petroleum residuum.

Advantageously, the process, and device, of the invention allow to reduce the viscosity of crude oil. Advantageously, a reduction in viscosity of the treated crude oil of 1 to 10%, particularly of 3 to 5% may be achieved by the process, and apparatus, of the invention.

Advantageously, the process, and device, of the present invention enable to increase the light hydrocarbon or boiling components (i.e. components have a boiling point of less than or equal to 360° C.) in the treated crude. Advantageously, an increase in the boiling components of 5 to 20%, for instance 8 to 14% may be achieved.

Advantageously the process, and device, of the present invention allows to provide a decrease in the pour point of the treated crude product.

A further particular advantage of the present invention is the minimization of energy required for carrying out the treatment of the crude oil to transform to lower viscosity products. The invention provides an efficient means for increasing the proportion of light hydrocarbons present in crude oil, petroleum residue, or mixtures thereof with components of crude.

Other advantageous objects and features will become apparent from the claims, from the description, and from the appended drawings, in which:

Figure 1:
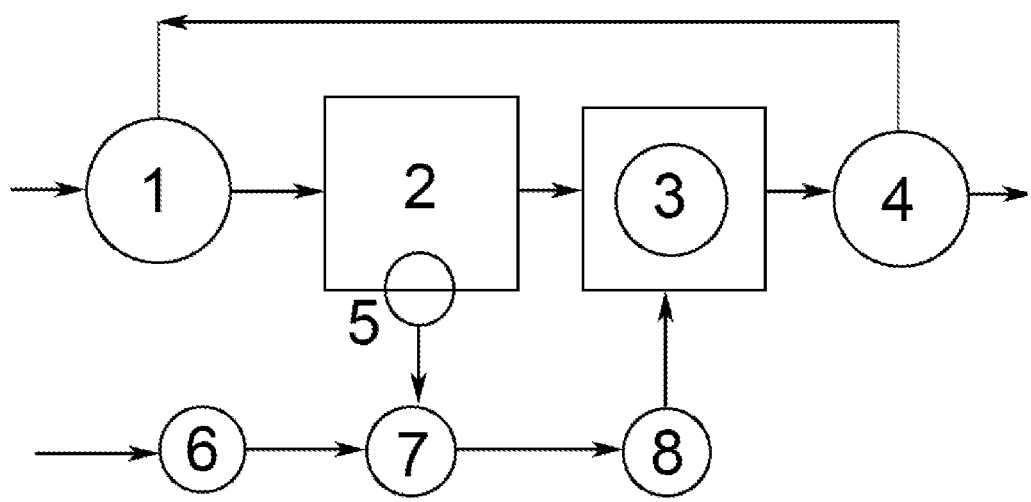
FIG. 1 is a schematic representation of a process according to an embodiment of the invention.

The solution chemistry of crude oil and alike systems, such as petroleum residues, mixtures of components of crude, referred to commonly as "crude dispersion systems" or "CDS", has been widely investigated in the literature (see e.g. Nellensteyn F. I. Asphalt//Colloid chemistry.—1931., Unger F. G., Andrejeva L. N. Grundlegende Aspekte der Chemie der Erdoele. Natur der Harze und Asphaltene// Erdoel und Kohle Erdgas Petrochemie.—1994. No 1). Crude dispersion systems are complicated systems of organic material in metastable, colloid state. Crude dispersion systems consist of associated combinations, miscelles, and macromolecules. In the literature it has been shown that a key component of such crude dispersion systems are agglomerates referred to as "complex structural unit" or "CSU", made up of molecules of different crude components (see, for instance, Unger F. G., Andreeva L. N., *Fundamental Aspects of Petroleum Chemistry. The nature of resins and asphalts*. Institute of Petroleum Chemistry SB RAS, Novosibirsk: Nauka. Siberian Publishing Firm RAS., 1995.). A particular example of CSU in crude dispersion systems comprise resinous-asphalt substances (also known as tar and asphalt substances). Behaviour of such heavy resinous-asphalt substances plays a major role in the recovery, transportation and processing of crude dispersion systems, and particularly with respect to heavy crude or petroleum residues.

In the literature two structural forms of resinous-asphalt containing CSU have been described: plate to plate (see, for example, Bogomolov A I., Gaile A A., *Chemistry of oil and gas*. St. Petersburg: Chemistry.—1995., P. 295., Ris. 11.1.) and onion skin (see, for example, Unger F. G., Andreeva L. N., *Fundamental Aspects of Petroleum Chemistry*, Novosibirsk., Nauka., 1995. S.165., Fig.6.3.1

It has been shown in the literature that these resinous-asphalt substances of crude dispersion systems have a paramagnetic nature (see, for instance, Muzamedzyanov I Z, Khafizov F. Sh., Kuzeyev I R: *Fractal model of condensed oil systems//Report of the Scientific and Technical Conference "Problems of synergetics."*, Ufa, Ufa Petroleum Institute., 1989 P. 60; or, Unger F. G., Andreeva L. N., *Fundamental Aspects of Petroleum Chemistry*, Novosibirsk., Nauka., 1995., P. 54-67.).

The structure of resinous-asphalt CSU comprises a paramagnetic core, made up of paramagnetic molecules and radicals, that is surrounded by a solvation layer made up of shells of diamagnetic molecules. The diamagnetic molecules are molecules of other components of crude, such as aromatics, geterolinks, naphthene-aromatic hydrocarbons, paraffin-napthene hydrocarbons. Different diamagnetic molecules are positioned in shells distanced from the paramagnetic core based on the value of potential of pair interactions amongst the molecules. Thereby the solvation layer comprises a number of concentric solvation shells formed by diamagnetic links with decreasing spin-dipole moments (indexes of free valence) as move away from the core. Different complex structural units have different number of layers depending on the type of crude. Outside the CSU, surrounding the solvation layer, is the dispersed system, comprising molecules in a dispersion environment (see Unger F. G., Andreeva L. N., *Fundamental Aspects of Petroleum Chemistry, Novosibirsk.*, Nauka., 1995.). It has been shown that attraction and separation of molecules in crude dispersion systems is caused by the exchange of paramagnetic and spin-polarized molecules. As a result, the structure of the complicated structural unit comprises the core formed by paramagnetic molecules and radicals, having the strongest intermolecular interaction potential. The core is surrounded by a series of solvation layers of diamagnetic molecules that interact with the core. Within the solvation layer structure molecules are grouped in layers depending on the similarity of interaction potential soft the molecules in a layer. The solvation layers are linked with each other, with the layers comprising molecules having lower spin-dipole moments situated farthest from the core. (See, for instance, Unger F. G., Andreeva L. N., *Fundamental Aspects of Petroleum Chemistry*, Novosibirsk., Nauka., 1995., P. 162-171). Such complex structural units thus behave as a molecule of large size.

The present invention is based on the treatment of crude oil, components of crude, or mixtures thereof, with acoustic vibrations and electromagnetic field of low intensity. The process of the present invention allows to increase the proportion of low boiling point components in the treated crude product by breaking up complex structural units in the crude dispersion system of crude oil, or components of crude such as petroleum residuum, by the action of acoustic vibrations and resonating electromagnetic field of low intensity.

Referring to the figures, in a process according to one embodiment of the present invention, shown schematically in FIG. 1, a flow of crude oil, or component of crude, for treatment is supplied through a pipe to a first treatment chamber 2 of ultrasound treatment. An ultrasound generator (not shown) is configured to emit ultrasound vibrations into the flow of crude to be treated. For example, the ultrasound generator may be located inside the treatment chamber, immersed in the liquid to be treated. Alternatively, the ultrasound generator may be positioned outside the treatment chamber, and emit ultrasound vibrations towards a wall of the treatment chamber, or may contact a wall of the treatment chamber.

Any suitable ultrasound generator may be used. For instance hydrodynamic type ultrasound generator, magnetostriction transformer, or any other apparatus capable of transforming mechanical or electrical energy into acoustic vibrations may be used as the ultrasound source. In a preferred embodiment the ultrasound generator is a hydrodynamic type ultrasound generator, e.g. a rotor-type hydrodynamic ultrasound generator. Such suitable ultrasound generators are known in the art and include commercially available ultrasound generators.

The intensity of the ultrasound oscillations should be lower than the level of intensity of ultrasound inducing cavitation. Preferably the intensity of the ultrasound vibrations is lower than 1 MW/m$^2$, for instance from 1 W/m$^2$ to 100×10$^3$ W/m$^2$, e.g. from 1×10$^3$ W/m$^2$ to 100×10$^3$ W/m$^2$.

The frequency of the acoustic vibrations may be between 20 Hz and 200×10$^3$ Hz, generally between 1×10$^3$ Hz and 100×10$^3$ Hz, e.g. between 1×10$^3$ Hz and 30×10$^3$ Hz. The ultrasound treatment may be carried out using ultrasound vibrations at a single frequency, or over a range of frequencies in the ultrasound range or at a number of discrete different frequencies in the range, preferably using frequency(ies) in the range of between 6×10$^3$ Hz and 30×10$^3$ Hz. In order to optimise disruption of the shells of CSU in the crude dispersion system under treatment, ultrasound treatment is preferably carried out at one or more frequency, e.g. over a range of frequency, corresponding to resonating frequencies of the intermolecular links between molecules in the shells of the CSU.

The value of resonating frequencies in the shells of CSU, occurs in a range of frequencies corresponding to resonating frequencies of different strength intermolecular interactions between different molecules in the different solvation layers of the CSU, and the different energies of interaction between the solvation layers and the paramagnetic core. The value of resonating frequencies, or range of resonating frequencies, is known based on fundamental studies (see for instance S. A. Altshuler: *Electron paramagnetic resonance*. Moscow, 1961 P. 80.; NM Emanuel, MG Kuzmin: *Electron paramagnetic resonance*., Moscow.,). Accordingly, the operating ultrasound frequency may be determined according to the literature. In a particular preferred embodiment of the invention, the working frequency of the ultrasound generator is in the range of 6×10$^3$ Hz to 30×10$^3$ Hz.

The dimensions of the treatment chamber are preferably configured to permit creation of standing wave, so as to provide reinforcement of the acoustic waves in the chamber. For example, for any selected frequency of acoustic vibration, the resonance chamber length may be determined as a multiple of the wavelength of the acoustic vibrations. In simple terms resonance length of a cylindrical treatment chamber L, may be determined according to:

$$L = I \times N,$$

where I is the wavelength of the acoustic vibration and N is an integer.

$$I = (V/f),$$

where f=frequency of the acoustic vibration(Hz), and V=velocity of acoustic wave in the media (m/s$^{-1}$). For instance, in non-viscous petroleum products V is approximately 1400 m/s.

Without wishing to be bound by a particular theory it is considered that, on exposure to the ultrasound vibrations, and particularly where resonating ultrasound vibrations are applied, energy from the ultrasound vibrations leads to destructive transformation of intermolecular links in the shells of the CSU, and to breaking up of the CSU solvation shells.

During ultrasound treatment of the crude (including components of crude, or mixtures) in chamber 2, electromagnetic field emitted from the crude under treatment is detected by electromagnetic field sensors 5, located in or near the treatment chamber 2. On breaking of intermolecular links in shells of CSU resonating electromagnetic field(s) formed in the crude and detected by the sensors 5. As sensors 5, known standard electromagnetic field sensor devices may be used.

The sensors 5 convert electromagnetic field emitted from crude under ultrasound treatment in chamber 2 into high frequency current. The high frequency current output from sensors 5 is transmitted to a blender 7. In the blender high frequency current output from sensors 5 is combined with high frequency current from an external current generator 6. Blender apparatus are known in the art, and standard, commercially available blender device may be used.

The current generator 6 produces high frequency AC current, preferably at frequencies corresponding to frequencies of resonating electromagnetic field permitting destruction of intermolecular interactions in the paramagnetic core of CSU. Suitable emitting frequency, or range of frequencies, of the generator 6 can be determined based on values provided in the literature and reference manuals, e.g. from previous studies of paramagnetic resonance in natural and artificial media similar to the media of crude, such as other dispersion systems, hydrocarbon containing liquid dispersion systems etc. Desired emitting frequency of generator 6 with respect to a particular crude to be treated can also be obtained by paramagnetic resonance studies on samples of the crude to be treated, for instance using an electronic electromagnetic resonance spectrometer, such as EMX 10/12 BRUKER, of Karlsruhe, Germany Ser. Nr 1496.

The emitting frequency of the high frequency current generator may preferably be in the range of from 0.3 to 100 GHz, preferably in the range of from 1 to 15 GHz. Known high frequency current generators may be used as the current generator 6. For example a source of microwave power may serve as a generator 6 of high frequency signals, e.g. at a frequency of around 10 GHz.

The generator 6 preferably operates at a power of no more than 1 W, e.g. in the range of $1\times10^{-3}$ W to 1 W, preferably in the range of $1\times10^{-2}$ W to $1\times10^{-1}$ W. Any current generator capable of emitting current in frequency and power range mentioned above may be used as the generator 6.

The high frequency currents output from the blender 7 are converted into high frequency electromagnetic fields of low intensity and emitted by a transmitter 8. Known electromagnetic filed transmitter devices, such as commercially available antennae, may be used.

The high frequency electromagnetic field output of transmitter 8 is transmitted to crude in a second treatment chamber 3. High frequency electromagnetic field emitted by transmitter 8 may, for instance, comprise electromagnetic field of frequencies in the range of 0.3 to 100 GHz, preferably in the range of from 1 to 15 GHz.

High frequency electromagnetic field of low intensity emitted by transmitter 8 may preferably have a power in the range of from around $1\times10^{4}$ to $1\times10^{-3}$ Watts.

Transmitter device may be located externally to treatment chamber 3, and/or may have transmitting element, e.g. antennae, located with chamber 3 for direct transmission of the electromagnetic radiation to the crude to be treated.

The high frequency electromagnetic field emitted by transmitter 8 produces a constantly changing magnetic field in the flow of crude in chamber 3. For example, for an emitting frequency of the high frequency current generator of 1 GHz, an oscillating magnetic field is produced in the treatment chamber 3, with a strength of e.g. from 0 to about 0.11 Tesla. Thus, resonance is created with different molecules in the crude, tens to thousands of times per second.

High frequency electromagnetic field of low intensity emitted by transmitter 8 comprises component of resonating electromagnetic field corresponding to resonating frequencies of intermolecular links in solvation shells of the CSU, and component of resonating electromagnetic field corresponding to resonating frequencies of intermolecular links within the paramagnetic cores of CSU.

Resonating electromagnetic field of high frequency emitted from transmitter 8 allows to disrupt and destroy intermolecular interactions of the solvation shells and paramagnetic core of CSU's in the crude dispersion system, leading to an increase in the proportion of lower molecular weight species in the treated crude. Exposure of crude dispersion systems (including mixtures) to high frequency resonating electromagnetic field of causes decrease in the level of exchange interaction between CSUs in the crude dispersion system and between molecules in the CSU. As a result the paramagnetic cores of CSU are broken up, and the shells of diamagnetic molecules around the cores are dissolved releasing the component molecules of the solvation shells into the dispersed system. CSU are broken up and move into the dispersed phase of the crude dispersion system.

Resonating electromagnetic fields of high frequency have a strong effect for modification of crude. Energy of high frequency electromagnetic fields reaches molecules of the paramagnetic cores of CSU, and enables the disruption of intermolecular interactions within the paramagnetic core, leading to destruction of the cores of CSUs.

The destruction of CSU in the crude dispersion system causes an increase in the proportion of lower molecular weight species, light hydrocarbons, in the treated crude.

Advantageously the process of the invention allows to increase the proportion of low boiling point components in crude oil, heavy fractions of crude, petroleum residuum, and mixtures thereof with petroleum products. Particularly the process of the invention allows to increase the proportion of useful fractions, such as diesel fraction.

Advantageously, destruction of CSU in the crude dispersion system causes reduction of viscosity and lower pour point of the modified CDS (including mixtures).

An advantage of the use of resonating high frequency electromagnetic field of low intensity is reduced costs of equipment and reduced energy consumption. The use of low intensity electromagnetic radiation also reduces risks to environment and humans on operation of the treatment process.

In the described embodiment treatment is carried out on a flux of the crude to be treated through a conduit, particularly a pipe. However the treatment of crude may also be carried out on discrete volumes, i.e. batches, of crude, or on crude contained in a container, e.g. a storage reservoir.

Advantageously the treatment of a flow of the crude fluid in a pipe, according to an embodiment of the invention, allows the effective treatment of crude on an industrial scale. Flow rates of, for instance, as much as 100 $m^3/h$, preferably in the range of 10 to 50 $m^3/h$, for instance in the range of 20 to 30 $m^3/h$ may be effectively treated by the process, and device of the present invention.

Where treatment is carried out on a flux of crude, the viscosity of crude may preferably be of the order of 100-150 cSt ($mm^2/s$) depending of the dimensions and properties of the flow conduit, to provide flow properties for optimising treatment efficacity. More viscous crude, e.g. for example some heavy crude oil, or petroleum residuum, may be heated to reduce to viscosity to preferred level. This optional heating should be carried out at less than 100° C.

Advantageously, the process, and device, according to embodiments of the invention enable the treatment of a flux of crude to be treated, with a mode of resonating ultrasound vibration in the ultrasound treatment chamber 2 that affects the full flow of the crude to be treated (crude dispersion system), with an intensity lower than the level required to cause the beginning of cavitation.

The treatment of a volume of the crude with electromagnetic field may be carried out simultaneously with the treatment of the crude with ultrasound vibrations, or consecutively to the ultrasound treatment, e.g. a volume of crude may be subjected to electromagnetic field at a short time interval (e.g. from 0.1 to 30 seconds) after exposure to ultrasound vibrations.

In the described embodiment crude to be treated is subjected to ultrasound vibrations in a first treatment chamber and subsequently to high frequency electromagnetic field in a second treatment chamber. However, it may also be envisaged to carry out the treatment with ultrasound vibrations and with high frequency electromagnetic field in a single treatment chamber, or alternatively within a storage container.

The process is preferably carried out at atmospheric pressure. However, the process may be carried out under pressure, e.g. under a pressure of between 1 to 100 MPa.

Optionally a portion, or all, of the treated crude output from the electromagnetic field treatment chamber 3 may recycled into the inflow of the treatment device for repeated treatment, in order to further optimise breaking up of CSU in the crude dispersion system. According to one embodiment an input controller 4 located downstream of the electromagnetic field treatment chamber 3, can work in an open mode, whereby treated crude flows out of the treatment device after a treatment cycle, or in a recycling mode whereby a portion, or all, of the treated crude output from the electromagnetic field treatment chamber is re-circulated for re-treatment. Re-circulated crude is input into the inflow of the treatment device via the inflow blender 1, and into the treatment chambers.

The process of recycling the flow of treated crude causes growth and stabilization of the high frequency currents output from the sensor 5. This phenomenon is associated with the process of relaxation of the absorbed energy of the high frequency resonating electromagnetic field components from the CSU in the treatment chamber 3. i.e. part of the energy absorbed by paramagnetic molecules on treatment with high frequency electromagnetic field in chamber 3, is released by these electromagnetic molecules after treatment (i.e. as pass through chamber 2 on re-cycling) in the relaxation phase. Energy released from electromagnetic molecules in flow of re-cycled treated crude in chamber 2 is detected by the electromagnetic field sensors 5. As a result, at the output of the blender 7, high frequency currents are strengthened and stabilized, leading to an increase in the process of breaking up of solvation shells and paramagnetic cores of CSU. Accordingly, the controller 4 (as shown in FIG. 1) allows to further optimize the extent of treatment of the crude to be treated and control desired result based on the quality of the untreated crude. For instance treatment of part, or all, of the crude may be repeated from 0 to 10 times, e.g. from 1 to 5 times, to optimise results of treatment.

The process of the invention may be carried out on industrial scale, using commercially available industrial apparatus.

Figure 2:
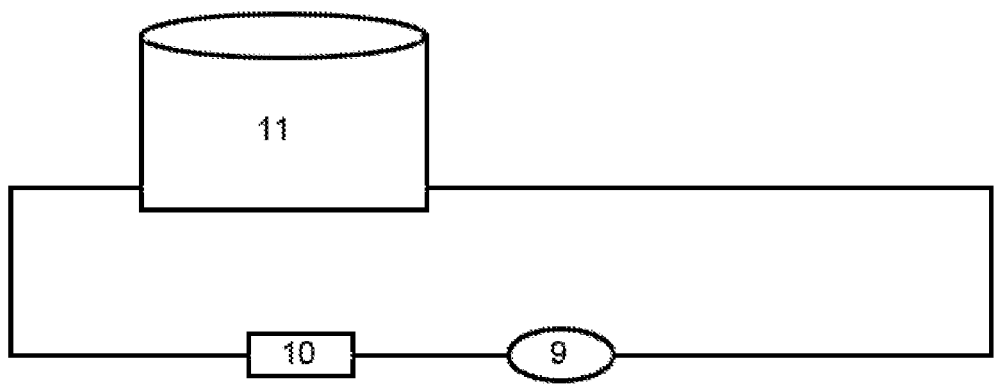
FIG. 2 is a schematic representation of a system for the implementation of the process according to an embodiment of the invention.

In one embodiment of an installation for carrying out a process according to the invention, as illustrated schematically in FIG. 2, crude to be treated (including crude oil, components of crude, and mixtures thereof) in a container, e.g. a storage reservoir 11, may be transported to the treatment device 10 in a conduit, e.g a pipe, using the action of a pump 9. Treated crude output from treatment device 10 may, optionally, be transported via a conduit back to the storage reservoir 11, e.g. forming a closed circulation loop. Alternatively, treated crude may be transported to a separate container, e.g. storage reservoir.

It has been observed that after the exposure to the resonating electromagnetic field and ultrasound vibrations according to the process of the invention, the chemical and physical properties of the treated crude continue to change to increase the content of the light crude fraction over a period of time, of the order to 2 to 30 days. Generally over 10 to 20 days to arrive at a final composition enhanced in the light hydrocarbons, which final composition does not change, or degrade on storage. Analysis of the treated crude using standard techniques, for example to analyse viscosity, pour point, density, or content of different boiling point fractions, allow easily to determine when the treated crude has reached its final stable composition.

Without wishing to be bound by a particular theory it is believed that the energy of resonating electromagnetic field adsorbed by the CSU on treatment with high frequency resonating electromagnetic field of low intensity, in treatment chamber 3, continues to cause destruction of paramagnetic cores of CSU during a time period after end of the exposure to external electromagnetic field source. In part, energy of electromagnetic field radiation liberated from paramagnetic cores of CSU on the breaking of intermolecular interactions within the paramagnetic core may be responsible for this continued breaking up of CSU after termination of exposure to the external electromagnetic field source.

According to an embodiment of the invention a volume of treated crude may be added after to treatment to a volume of untreated crude, e.g. in a storage reservoir, or in a production well. Preferably the volume of untreated crude should comprise a component having substantially the same composition as a component of the treated crude, before treatment. It has been observed that, on storage of the mixture of treated and untreated crude, for instance over a period of around 2 to 30 days, e.g. from 10 to 20 days, physical and/or chemical properties of the mixture of untreated and treated crude, are improved, such as lower viscosity, lower pour point and/or increase in the proportion of low boiling point components.

Thereby, advantageously, the invention makes it possible to improve chemical and/or physical properties (e.g. lower viscosity, lower pour point and/or increase in the proportion of low boiling point components) of a volume of crude to be treated (including mixtures), whilst subjecting only a proportion of at least one component of the crude to be treated, to the ultrasound and high frequency electromagnetic field treatment process of the invention.

Advantageously, the process of the invention avoids cracking of the hydrocarbon molecules of the crude dispersion system, due to the low intensity of the ultrasound vibrations to which the flow of crude to be treated in subjected, i.e. by using ultrasound vibrations having low intensity, lower than the intensity necessary to cause cavitation.

Treated crude may be stored in storage tanks, or in the production well, for e.g. 10 to 20 days to achieve the maximum result of conversion to the desired lighter hydrocarbons.

To implement the process of the invention, industrial standard parts (such as electrical chips, diodes) that are commonly used in the art may be applied.

After the exposure to the resonating electromagnetic field and the information signal, the chemical and physical properties of the treated crude change to increase the content of the crude-determined desired light crude fraction (s) over a period of time, of the order to 2 to 30 days. Generally over 10 to 20 days to arrive at a final composition enhanced in the light hydrocarbons, which final composition does not change, or degrade on storage.

It has been found that the process of the invention allows to provide a significant reduction in viscosity of crude oil, e.g. a reduction of 1 to 40 percent in viscosity, for instance a reduction of commonly as much as 20 to 35 percent reduction in viscosity. The process of the invention is also shown to provide a significant increase of the boiling components in the treated crude, generally an increase in the low boiling components ("light fractions") of about 5 to about 80% may be achieved, for instance an increase of the low boiling components of around 10 to around 20% may be achieved. Advantageously the process of the invention allows to provide a significant increase in the useful diesel fraction in crude oil or components of crude, particularly heavy crude or petroleum residue. For instance an increase in diesel fraction of heavy crude or petroleum residuum of as much as 10 to 60% may be achieved.

Advantageously treatment of crude according to the process of the present invention permits to obtain treated crude having good yield of lighter hydrocarbon components, particularly useful diesel fractions, without requiring any subsequent step of cracking (e.g. by thermal cracking or catalytic cracking processes) of the treated crude.

The process of the invention has been found to provide a significant reduction in pour point of treated crude oil or components of crude (including mixtures), particularly heavy crude or petroleum residue. For instance a decrease in pour point of treated crude of around 8 to 16° C. may be achieved, depending on the properties of the untreated crude being used. Pour point may be determined by known methods, such as using the ASTM International standard test ASTM 5853.

The invention can be used during the operation of transfer of crude at sea ports or during transportation on sea tankers. Alternatively, the adding of crude treated with the information signal to the production zones in oil well increases both integrity of the well and production rates due to the lower viscosity of the extracted crude.

A significant advantage of the invention is that the observed reduction in viscosity, and increase in low boiling components is achieved in an energy efficient manner.

The invention may be further described in reference to the following examples, included by means of illustration.

EXAMPLE 1

From a reservoir containing 2,000 tons of crude oil complying with standard GOST 51858-2002, two hundred tons of the crude oil contained in the reservoir were circulated through a closed loop fluid circulation system as depicted in FIG. 2. Whereby the 200 tons of untreated crude were circulated (at flow rate of 35 m$^3$/hr) through a treatment system as depicted in FIG. 1, by the action of a circulating pump. Velocity of flow through the two treatment chambers was 0.7 to 1 m/s.

Acoustic vibrations of frequency 6×10$^3$ Hz were generated using a hydrodynamic ultrasound generator in a cylindrical treatment chamber having diameter 122 mm and length 0.644 m. External source of high frequency current was provided by an industrial type generator G4-G111, operating at a frequency range of 1 to 15 GHz.

After treatment the treated crude was returned to the reservoir. Eighteen days after treatment analysis of the total crude contained in the reservoir was conducted, according to ASTM International Standard test D86. Results are depicted in Table 1.

TABLE 1

| Content v/v (%) | Crude Boiling temp. (° C.) | Processed crude Boiling temp. (° C.) |
|---|---|---|
| Initial Boiling Point (IBP) | 46 | 43 |
| 10 | 127 | 125 |
| 20 | 161 | 149 |
| 30 | 283 | 256 |
| 40 | 330 | 280 |
| 50 | 360 | 338 |
| 60 | n/a | 355 |
| 65 | n/a | 360 |

The results show that the processed crude contains 15% more light components. This correlates to an additional 300 tons of diesel fuel fraction, due to decrease in the proportion of petroleum residuum.

EXAMPLE 2

Two thousand tons of fuel oil of grade 100, that meets standard GOST 10585-2002, were treated as described in example 1. The processed heating oil was analyzed fifteen days after treatment. Results are shown in Table 2.

TABLE 2

| Parameter | Fuel oil | Processed fuel oil |
|---|---|---|
| Specific Gravity at 20° C. | 1.04 | 0.98 |
| Viscosity at 50° C. (cSt) mm$^2$/s | 600 | 480 |
| Pour Point (° C.) | 21 | 9 |

The processed fuel oil is seen to have lower viscosity and lower pour point (gelling temperature).

EXAMPLE 3

750 tonnes of fuel oil residue of grade 100, complying to standard GOST10585-2002, and 250 tonnes of Naphtha gasoline, complying to standard TU 38-402-62-120-90 held in a Reservoir 1, vol. 1,000 m$^3$ were circulated through a system as described in the experiments 1 and 2 above. After treatment the treated mixture was pumped to a reservoir 2 which contained 1000 tonnes of crude complying to standard GOST 51858-2002. Fourteen days after treatment analysis of the resultant mixture of crude, gasoline and fuel oil in reservoir 2 was carried out. Results are shown in Table 3.

TABLE 3

| Content v/v (%) | Before treatment Reservoir 2 (1,000 tones) boiling pt. ° C. | Before treatment Reservoir 1 (1,000 tons) boiling pt. ° C. | After treatment Reservoir 2 (2,000 tonnes) boiling pt. ° C. |
|---|---|---|---|
| Initial Boiling Point (IBP) | 75 | 46 | 43 |
| 5 | 112 | 106 | 109 |
| 10 | 137 | 127 | 129 |
| 20 | 191 | 161 | 180 |
| 30 | 241 | 295 | 256 |
| 40 | 281 | 330 | 308 |
| 50 | 315 | 355 | 338 |
| 55 | 360 | 360 | 346 |
| 60 | n/a | n/a | 350 |
| 70 | n/a | n/a | 358 |
| 72 | n/a | n/a | 360 |

Analysis showed (i) in 2,000 tons of processed crude there were 1,440 tons of light fractions. This is 17% more than in crude oil.

(ii) the processed crude has viscosity of 869.6 kilo/m$^2$., which correlates to 30.47 API. At such viscosity crude represents crude oil of the middle grade.

The invention claimed is:

1. A process for the treatment of crude oil, component(s) of crude, or mixtures thereof, comprising: subjecting crude to be treated to ultrasound vibrations and to an electromagnetic field emitted by an electromagnetic field generator; wherein the electromagnetic field emitted by said electromagnetic field generator comprises a component of electromagnetic field modulated by an electromagnetic field emitted from the crude to be treated on the exposure thereof to ultrasound vibrations, wherein the electromagnetic field emitted by the crude on treatment with ultrasound vibrations is detected and converted into an electrical current signal by one or more electromagnetic field sensor(s) and the current signal is transformed into an electromagnetic field by the electromagnetic field generator.

2. A process according to claim 1, wherein the electromagnetic field emitted by the electromagnetic field generator comprises a component of electromagnetic field generated by an external electronic or electromechanical source.

3. A process according to claim 2, wherein the external electronic or electromechanical source of electromagnetic field operates at one or more frequencies producing resonant excitation of the crude to be treated.

4. A process according to claim 2, wherein the external electronic or electromechanical source of electromagnetic field comprises a high frequency current generator.

5. A process according to claim 2, wherein the external electronic or electromechanical source of electromagnetic field operates at one or more frequencies in the range of from 1 to 15 GHz.

6. A process according to claim 2, wherein the external electronic or electromechanical source of electromagnetic field comprises a high frequency current generator, and wherein a current output of the electromagnetic field sensor(s) and a current output of the current generator are combined and said combined current signal is transformed into an electromagnetic field.

7. A process according to claim 1, wherein the crude to be treated is subjected to treatment with ultrasound vibrations in a first treatment chamber and subsequently subjected to treatment with the electromagnetic field emitted by the electromagnetic field generator in a second treatment chamber.

8. A process according to claim 1, comprising subjecting a flow of crude to be treated to ultrasound vibrations emitted by a source of ultrasound; detecting an electromagnetic field emitted by said crude on treatment with ultrasound and converting said detected electromagnetic field into an electric current signal;
    generating a high frequency electrical current signal using a current generator;
    combining said current signal produced by conversion of the detected electromagnetic field emitted by the crude on treatment with ultrasound with said current signal generated by the current generator; transforming the combined current signal into an electromagnetic field; and subjecting the flow of crude to be treated to the thus produced electromagnetic field.

9. A process according to claim 1, further comprising a step of subjecting at least a portion of the flow of crude treated with ultrasound vibrations and electromagnetic field according to claim 1, to one or more additional cycles of treatment with ultrasound vibrations and electromagnetic field according to claim 1.

10. A process according to claim 1, further comprising a step of feeding at least a portion of the crude oil, component(s) of crude, or mixture thereof, treated according to claim 1 into a volume of untreated crude oil, component(s) of crude, or mixture thereof.

* * * * *